United States Patent [19]

McCoy et al.

[11] Patent Number: 4,822,875

[45] Date of Patent: Apr. 18, 1989

[54] SUCROSE POLYESTERS WHICH BEHAVE LIKE COCOA BUTTERS

[75] Inventors: Stephen A. McCoy; Bryan L. Madison; Peter M. Self; David J. Weisgerber, all of Cincinnati, Ohio

[73] Assignee: The Procter & Gamble Company, Cincinnati, Ohio

[21] Appl. No.: 189,444

[22] Filed: May 2, 1988

Related U.S. Application Data

[63] Continuation of Ser. No. 942,902, Dec. 17, 1986, abandoned.

[51] Int. Cl.$^4$ .............................................. A23G 1/00
[52] U.S. Cl. ................................... 536/119; 426/531; 426/607; 426/612; 426/613; 426/804
[58] Field of Search ................ 536/119; 426/531, 611, 426/601, 612, 613, 804

[56] References Cited

U.S. PATENT DOCUMENTS

| | | | |
|---|---|---|---|
| 2,442,536 | 6/1948 | Eckey | 426/601 X |
| 2,893,990 | 7/1959 | Hass et al. | |
| 2,999,023 | 9/1961 | Babayan et al. | |
| 3,059,010 | 10/1962 | Schmid et al. | 426/612 |
| 3,158,490 | 11/1964 | Baur et al. | 426/612 X |
| 3,595,673 | 7/1971 | Seiden | 426/607 X |
| 3,600,186 | 8/1971 | Mattson et al. | |
| 3,649,647 | 3/1972 | Ota et al. | |
| 3,956,278 | 5/1976 | Prey | |
| 3,963,699 | 6/1976 | Rizzi et al. | 426/611 |
| 4,005,195 | 1/1977 | Jandacek | |
| 4,005,196 | 1/1977 | Jandacek | |
| 4,034,083 | 7/1977 | Mattson | |
| 4,241,054 | 12/1980 | Volpenhein et al. | |
| 4,363,763 | 12/1982 | Peterson | 260/410.6 |
| 4,382,924 | 5/1983 | Berling | 426/601 |

FOREIGN PATENT DOCUMENTS 53-47804  4/1978  Japan .................................. 426/531

OTHER PUBLICATIONS

Hickson, "Sucrochemistry", ACS Symposium Series 41, p. 98 (1977).
Swern, Bailey's Industrial Oil and Fat Products, vol. 1, 4th Ed., pp. 323-327, 343 (1979).
Kirk-Othmer, Encyclopedia of Chemical Technology, 3d Ed., vol. 9, p. 800 (1980).
Dwivedi, Low Calorie and Special Dietary Foods, CRC Press, West Palm Beach, Florida (1978), pp. 66-67 and pp. 110-111.

*Primary Examiner*—Joseph Golian
*Attorney, Agent, or Firm*—Gary M. Sutter; Ronald L. Hemingway; Richard C. Witte

[57] ABSTRACT

The invention is a cocoa butter substitute comprising sucrose fatty acid esters having at least four fatty acid ester groups, and having the following fatty acid composition: (a) from about 25% to about 50% lauric acid; (b) from about 50% to about 75% palmitic acid; and (c) up to about 5% other fatty acids, preferably selected from the group consisting of capric, myristic, and stearic acids, and mixtures thereof. Alternatively, the cocoa butter substitute can comprise sucrose fatty acid esters having at least four fatty acid ester groups, and having the following fatty acid composition: (a) from about 25% to about 50% capric acid; (b) from about 50% to about 75% stearic acid; and (c) up to about 5% other fatty acids.

The cocoa butter substitute is noncaloric and less expensive than natural cocoa butter. It has the same desirable melting properties as natural cocoa butter.

10 Claims, 3 Drawing Sheets

SUCROSE POLYESTERS WHICH BEHAVE LIKE COCOA BUTTERS

RELATED APPLICATION

This is a continuation of application Ser. No. 942,902, filed on Dec. 17, 1986, now abandoned.

FIELD OF THE INVENTION

This invention relates to sucrose polyesters that are useful as cocoa butter substitutes.

BACKGROUND OF THE INVENTION

Natural cocoa butter is a unique fat. It has a melting point at around body temperature. In addition, it has a high solids content at room temperature and a sharp melting curve that leads to a low level of solids at body temperature. These unique melting properties make cocoa butter the most preferred fat for use in chocolate and other related confections, because the chocolate remains solid at room temperature but melts rapidly in the mouth to provide a cool, non-waxy taste with excellent flavor display.

Unfortunately, cocoa butter is relatively expensive, so there have been many attempts to find less costly substitutes for cocoa butter with similar properties. It has been impossible to duplicate the properties of cocoa butter in synthetic triglyceride fats, because cocoa butter contains triglycerides having palmitic acid in the one and three positions and oleic acid in the two position. On a macroscopic scale, excessive rearrangement prevents the synthesis of triglycerides having the palmitic-oleic-palmitic combination.

Another drawback of natural cocoa butter is its polymorphic instability. Tempering is required to reach the desired crystal structure for good mouthmelt. Chocolate bloom is another problem caused by the polymorphic properties of the cocoa butter.

Cocoa butter is also high in calories. One of the most common metabolic problems among people today is obesity, which has been related to coronary artery disease. Therefore, it would be desirable to find a substitute for cocoa butter that is low in calories.

Sucrose polyesters and other polyol polyesters have been used to make noncaloric food compositions. U.S. Pat. No. 3,600,186 to Mattson et al. discloses low calorie, fat-containing, food compositions in which at least a portion of the triglyceride content is replaced with a polyol fatty acid ester, the polyol fatty acid ester having at least four fatty acid ester groups with each fatty acid having from 8 to 22 carbon atoms.

U.S. Pat. No. 2,999,023 to Babayan et al. discloses confectionary coating compositions said to be resistant to bloom, comprising a hard butter plus fatty acid esters of sucrose. The esters are of fatty acids having 10 to 24 carbon atoms and mixtures thereof. From 1 to 8 fatty acids are present per sucrose molecule, and the amount of sucrose ester is 0.5% to 10% by weight of the hard butter.

Among the attempts at making cocoa butter substitutes is that described in U.S. Pat. No. 3,649,647 of Ota et al. Disclosed are cocoa butter substitutes comprising sugar alcohols esterified with fatty acids. The sugar alcohols have 5 to 6 carbon atoms and can include xylitol, sorbitol, mannitol and sorbitan. The sugar alcohols are esterified with 1 to 3 moles, per mole of the sugar alcohol, of a higher saturated fatty acid having 14 to 18 carbon atoms, and at least one mole, per mole of the sugar alcohol, of a lower saturated fatty acid having 2 to 4 carbon atoms.

It is an object of the present invention to produce a cocoa butter substitute having the desirable melting characteristics of natural cocoa butter.

It is another object of the present invention to provide a cocoa butter substitute that is less expensive and contains fewer calories than natural cocoa butter.

It is a further object of the present invention to provide a cocoa butter substitute that avoids the polymorphic instability of natural cocoa butter.

These and other objects of the invention will become evident from the disclosure herein.

All percentages are by weight unless otherwise defined.

SUMMARY OF THE INVENTION

Figure 1:
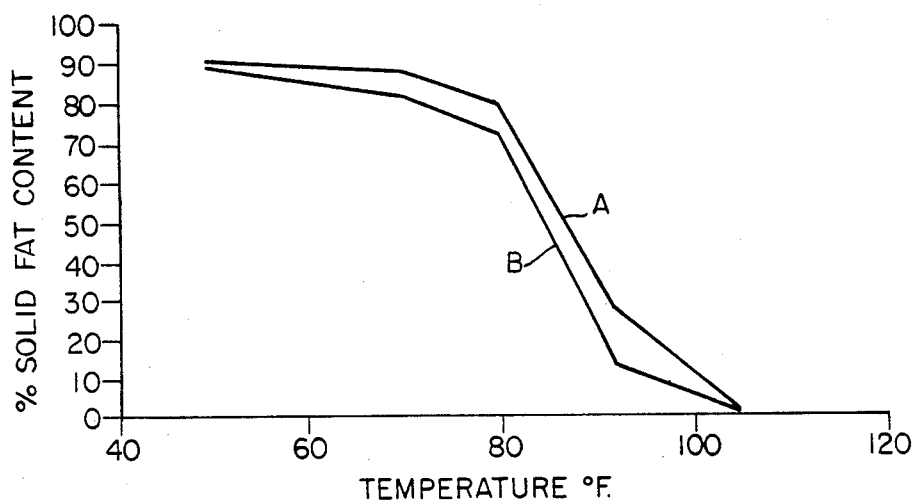
FIG. 1 illustrates the SFC profiles of natural cocoa butter and a cocoa butter substitute prepared according to the present invention.

The invention is a cocoa butter substitute comprising sucrose fatty acid esters having at least four fatty acid ester groups, and having the following fatty acid composition: (a) from about 25% to about 50% lauric acid; (b) from about 50% to about 75% palmitic acid; and (c) up to about 5% other fatty acids, preferably selected from the group consisting of capric, myristic, and stearic acids, and mixtures thereof. Alternatively, the cocoa butter substitute can comprise sucrose fatty acid esters having at least four fatty acid ester groups, and having the following fatty acid composition: (a) from about 25% to about 50% capric acid; (b) from about 50% to about 75% stearic acid; and (c) up to about 5% other fatty acids.

The cocoa butter substitute is noncaloric and less expensive than natural cocoa butter. It has the same desirable melting properties as natural cocoa butter.

DETAILED DESCRIPTION OF THE INVENTION

The present invention is concerned with the production of a cocoa butter substitute. It has now been surprisingly discovered that certain fatty acid esters of sucrose can be synthesized that behave very much like natural cocoa butter in their melting characteristics.

The present cocoa butter substitute comprises sucrose fatty acid esters having at least four fatty acid ester groups, and having the following fatty acid composition: (a) from about 25% to about 50% lauric acid; (b) from about 50% to about 75% palmitic acid; and (c) up to about 5% other fatty acids. Preferably, the esters will have from about 30% to about 40% lauric acid, from about 55% to about 65% palmitic acid, and up to about 5% other fatty acids. Most preferably, the esters will have about 35% lauric acid, about 60% palmitic acid, and about 5% other fatty acids. The other fatty acids are preferably selected from the group consisting of capric, myristic, and stearic acids, and mixtures thereof.

Alternatively, the cocoa butter substitute comprises sucrose fatty acid esters having at least four fatty acid ester groups, and having the following fatty acid composition: (a) from about 25% to about 50% capric acid; (b) from about 50% to about 75% stearic acid; and (c) up to about 5% other fatty acids. Preferably, the esters will have from about 30% to about 40% capric acid, from about 55% to about 65% stearic acid, and up to about 5% other fatty acids. Most preferably, the esters will have about 35% capric acid, about 60% stearic acid, and about 5% other fatty acids. The other fatty acids are preferably selected from the group consisting of lauric, myristic, and palmitic acids, and mixtures thereof.

In order to be noncaloric, the sucrose fatty acid esters must have at least four fatty acid ester groups. It is preferable that the sucrose contain no more than three unesterified hydroxyl groups, and more preferable that the sucrose contain no more than two unesterified hydroxyl groups. Most preferably, substantially all of the hydroxyl groups of the sucrose are esterified with fatty acids, i.e., the compound is substantially completely esterified.

The method of esterifying the sucrose is not critical. Sucrose polyesters are generally synthesized by one of four methods: transesterification of the sucrose with methyl, ethyl or glycerol fatty acid esters; acylation with a fatty acid anhydride; acylation with a fatty acid chloride; or acylation with a fatty acid per se. As an example, the preparation of sucrose polyesters is described in U.S. Pat. Nos. 2,831,854 and 3,521,827 (herein incorporated by reference).

When the sucrose fatty acid esters are synthesized by transesterification of sucrose with methyl esters to make esters of lauric and palmitic fatty acids, the ratio of lauric to palmitic methyl esters in the reaction mixture should be between about 65:35 and about 35:65, preferably between about 60:40 and about 40:60, and most preferably between about 55:45 and about 45:55. When sucrose fatty acid esters of capric and stearic acid are made by this process, the ratio of capric to stearic acid should also be between about 65:35 and about 35:65, preferably between about 60:40 and about 40:60, and most preferably between about 55:45 and about 45:55.

Fatty acids per se or naturally occurring fats and oils can serve as the source of the fatty acid components in the cocoa butter substitute. For example, palmitic acid can be provided by tallow, soybean oil, or cottonseed oil. Coconut oil is a good source of lauric acid.

The present cocoa butter substitute is very much like natural cocoa butter in its melting characteristics. It has a melting point at about body temperature, a high solids content at room temperature, and a sharp melting curve leading to a low solids content at body temperature. (See FIG. 1, discussed below.) As a result, chocolate compositions made with the present cocoa butter substitute have rapid mouthmelt and excellent non-waxy taste.

The polymorphic instability problems of natural cocoa butter are also avoided by the present cocoa butter substitute. Natural cocoa butter requires tempering for proper crystalline stability and has a tendency to produce chocolate bloom. Different kinds of tempering conditions normally encountered by cocoa butter, or the lack of tempering, have little effect on the polymorphic structure of the present cocoa butter substitute. Because there is little effect from different tempering conditions, chocolate bloom is avoided.

Surprisingly, the present cocoa butter substitute uses a totally different crystal structure to achieve melting properties similar to those of cocoa butter. Cocoa butter is made up of beta or beta-prime crystals, whereas the present cocoa butter substitute has alpha phase crystals. The alpha phase is very stable polymorphically.

Among the other benefits of the present cocoa butter substitute is its lower cost compared to natural cocoa butter. The cocoa butter substitute is also noncaloric, so it can be used to make low calorie chocolates and other confections. Sucrose fatty acid esters containing at least four fatty acid ester groups are substantially non-absorbable and non-digestible by the human body, and thus noncaloric.

Another advantage of the present cocoa butter substitute is the ability to alter the melting point by changing the ratio of the fatty acids. For example, if it is desired to make a product that melts more slowly, more palmitic and less lauric acid is used. If a more rapidly melting product is desired, more lauric acid is used.

ANALYTICAL METHODS

Solid Fat Content: The method for determining Solid Fat Content (SFC) values of a fat by PNMR is described in Madison and Hill, *J. Amer. Oil. Chem. Soc.*, Vol. 55 (1978), pp. 328–31 (herein incorporated by reference). Before determining SFC values, the fat material sample is heated to a temperature of 158° F. (70° C.) or higher for at least 0.5 hours or until the sample is completely melted. The melted sample is then tempered at a temperature of 40° F. (4° C.) for at least 72 hours. After tempering, the SFC value of the fat material at a temperature of 100° F. (38° C.) is determined by pulsed nuclear magnetic resonance (PNMR).

Fatty Acid Composition: The fatty acid composition is determined by gas chromatography, utilizing a Hewlett-Packard Model S712A gas chromatograph equipped with a thermal conductivity detector and a Hewlett-Packard Model 7671A automatic sampler. The chromatographic method utilized is described in *Official Methods and Recommended Practices of the American Oil Chemists Society*, 3rd Ed., 1984, Procedure Ce 1-62.

The following examples are intended only to further illustrate the invention and are not intended to limit the scope of the invention which is defined by the claims.

EXAMPLE 1

A cocoa butter substitute is made by transesterifying sucrose with a 50:50 molar ratio of methyl laurate and methyl palmitate. Into a stainless steel reaction vessel provided with mechanical stirring means is introduced 699 g. of methyl laurate, 882 g. of melted methyl palmitate, 100 g. of methanol, and 25 g. of potassium hydroxide. These reactants are agitated at room temperature for 30 minutes. Then 175 g. of sucrose, 7 g. of $K_2CO_3$, and 13 more g. of methanol are added to the reaction vessel. The mixture is heated to 212° F. (100° C.) at atmospheric pressure, then full vacuum is applied and the mixture is heated to 266° F. (130° C.) for the transesterification reaction. The reaction is continued at this temperature for 2 hours. At the end of 2 hours, the reaction is terminated by cooling to between 149° F. (65° C.) and 185° F. (85° C.).

The crude reaction mixture is washed by agitation with a dilute solution of methanol, sodium chloride and water. The volume of this wash solution is equal to 20% to 40% of the reaction mixture volume. The mixed phases are then allowed to settle for approximately 30 to 60 minutes. The lower settled phase which contains the soaps, excess sugars and methanol is drawn off and discarded. The upper settled phase which comprises the refined sucrose fatty acid esters is washed again. Usually 2 to 4 washes are used.

The sucrose polyesters are then washed with a 1% glacial acetic acid in water solution at 10% to 20% of the volume of the reaction mix. This is followed by water wash of the same volume.

The reaction mix is then dried under vacuum. The reaction mixture is then treated with an oil bleaching agent and filtered. The bulk of the unreacted methyl esters are removed by distillation at 374° F. (190° C.) to 482° F. (250° C.) under approximately 5 mm Hg of vacuum.

The sucrose fatty acid ester is then deodorized in a stainless steel batch deodorizer or other suitable device at 374° F. (190° C.) to 482° F. (250° C.) under a vacuum of about 5 mm of Hg with steam sparging. Deodorization is continued until the methyl ester content is below 200 ppm. The deodorizer contents are then cooled to 149° F. (65° C.) while using inert gas sparging. The sucrose fatty acid ester is stored in clean stainless steel drums.

The sucrose fatty acid ester product has the following GCFAC and SFC measurements:

| | | |
|---|---|---|
| SFC at | 50° F. (10° C.): | 90.2 |
| | 70° F. (21° C.): | 88.4 |
| | 80° F. (27° C.): | 79.5 |
| | 92° F. (33° C.): | 27.8 |
| | 105° F. (41° C.): | 1.3 |
| GCFAC | C12 | 34.4% |
| | C14 | 2.1% |
| | C16 | 61.6% |
| | C16:1 | 0 |
| | C18 | 1.9% |
| | C18:1 | 0 |
| | C18:2 | 0 |
| | C18:3 | 0 |
| | C20 | 0 |
| | C22 | 0 |

The graph in FIG. 1 illustrates that the present cocoa butter substitute has a melting profile surprisingly similar to that of natural cocoa butter. Curve A illustrates the SFC profile of the sucrose polyester prepared in Example 1. Curve B illustrates a typical SFC profile of natural cocoa butter. It is seen that, like the cocoa butter, the present cocoa butter substitute has a high solids content between about 50° F. (10° C.) and 80° F. (27° C.), then melts very quickly between 80° F. (27° C.) and 105° F. (41° C.) to a very low solids content at 105° F. (41° C.). Therefore, the cocoa butter substitute provides rapid mouthmelt and good flavor display when used in chocolates or other confections.

EXAMPLE 2

A cocoa butter substitute prepared as in Example 1 and a natural cocoa butter are each subjected to various tempering conditions normally associated with cocoa butter. The tempering conditions are denoted as follows:

C: 3 hrs. at 32° F. (0° C.), 24 hrs. at 83° F. (28° C.), 16 hrs. at 32° F. (0° C.)
D: 30 min. at 80° F. (27° C.), 15 min. at 32° F. (0° C.)
E: 24 hrs. at 60° F. (16° C.), 24 hrs. at 70° F. (21° C.), 1 hr. at 32° F. (0° C.)
F: 1.5 hrs. at 32° F. (0° C.), 48 hrs. at 75.4° F. (24° C.), 1.5 hrs. at 32° F. (0° C.)
G: 1 hr. at 80° F. (27° C.), 5 min. at 32° F. (0° C.).

Figure 2:
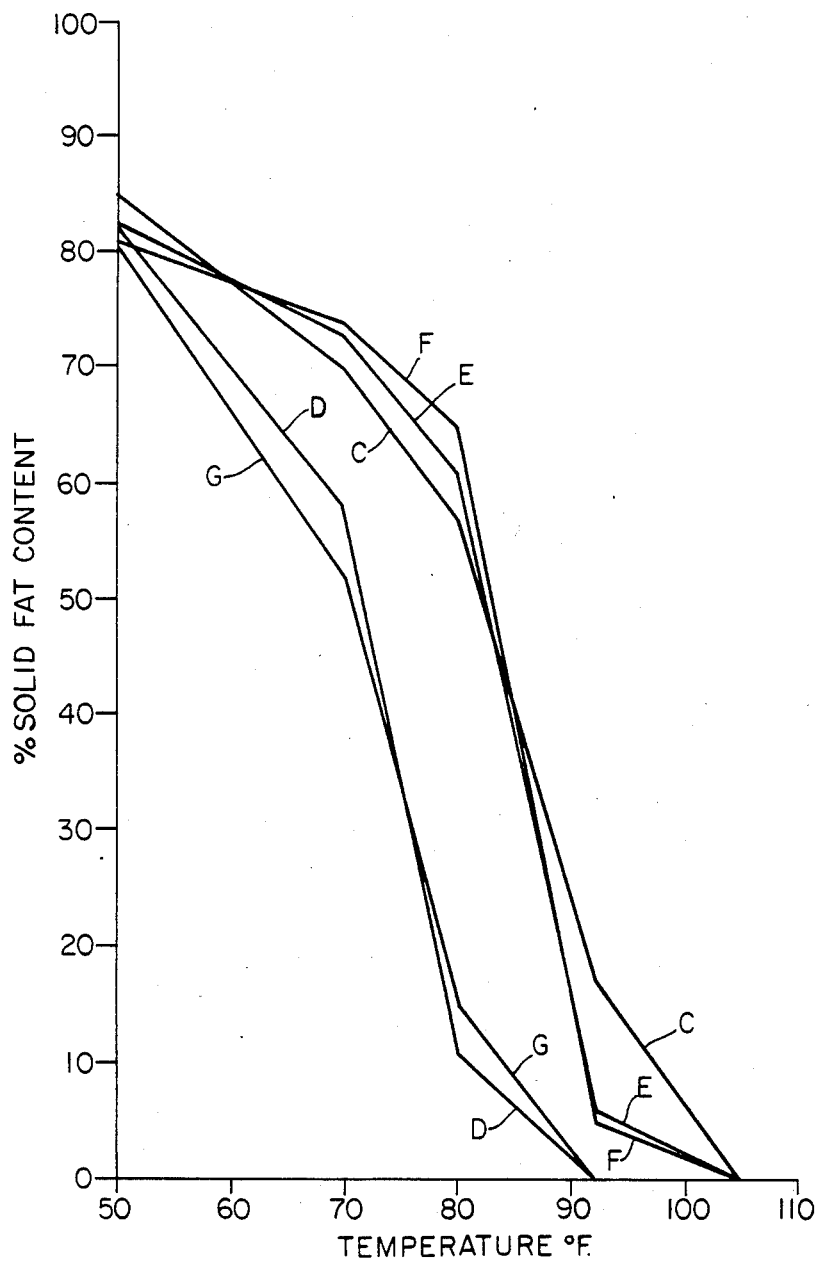
FIGS. 2 and 3 illustrate the effect of different tempering conditions on the SFC profiles of natural cocoa butter and a cocoa butter substitute prepared according to the present invention.
Figure 3:
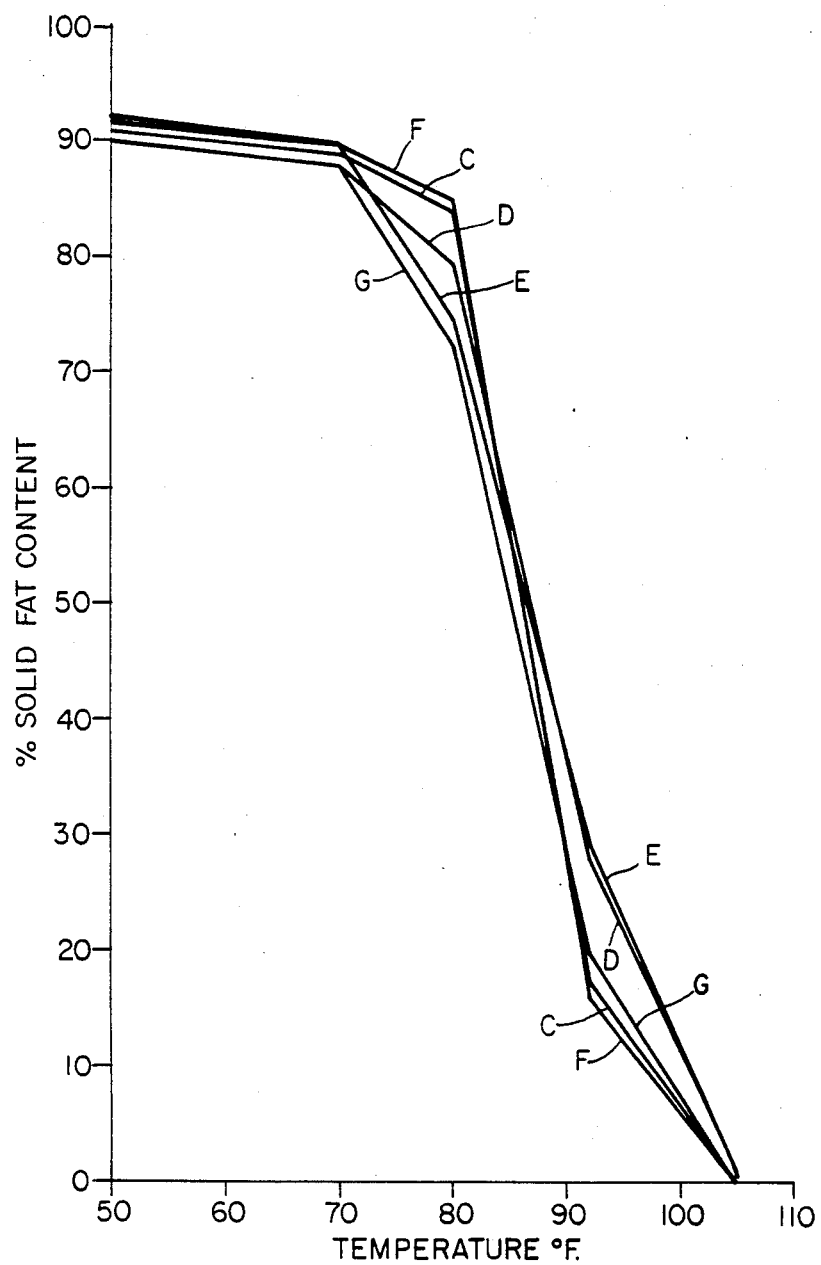

FIG. 2 illustrates SFC curves of the natural cocoa butter tempered under these various conditions, while FIG. 3 illustrates SFC curves of the cocoa butter substitute tempered under the same conditions. The cocoa butter substitute is affected very little by the different tempering conditions. It retains its high solid fat content between 70° F. (21° C.) and 80° F. (27° C.), and its curve drops sharply between 80° F. (27° C.) and 92° F. (33° C.). In contrast, the natural cocoa butter shows undesirable effects from the different tempering conditions. Most notably, the solid fat content between 70° F. (21° C.) and 80° F. (27° C.) drops off instead of retaining the high level. In addition, the SFC below 70° F. (21° C.) is also reduced under some tempering conditions.

EXAMPLE 3

A chocolate product is made using a sucrose fatty acid ester prepared as in Example 1. The following ingredients are used:

| Ingredient | Percentage |
|---|---|
| Sugar (12X) | 48% |
| Chocolate liquor | 14% |
| Milk solids | 18% |
| Sucrose fatty acid ester cocoa butter substitute | 20% |

The sucrose fatty acid ester and chocolate liquor are mixed together using a Hobart mixer at medium speed, at a temperature of about 130° F. (54° C.). Then the sugar and milk solids are added, and the ingredients are thoroughly mixed at medium speed until the temperature again reaches 130° F. (54° C.). Mixing continues for another 45 minutes at 130° F. (54° C.). Lastly, the ingredients are cooled to 100° F. (38° C.), molded, and held at 60° F. (16° C.) until solid. The chocolate product is good-tasting and melts rapidly in the mouth.

What is claimed is:

1. A cocoa butter substitute comprising sucrose fatty acid esters having at least four fatty acid ester groups, and where the make-up of the fatty acid groups is, by weight:
   (a) from about 25% to about 50% lauric acid;
   (b) from about 50% to about 75% palmitic acid; and
   (c) up to about 5% other fatty acids.

2. A cocoa butter substitute according to claim 1 where the make-up of the fatty acid groups is, by weight:
   (a) from about 30% to about 40% lauric acid;
   (b) from about 55% to about 65% palmitic acid; and
   (c) up to about 5% other fatty acids.

3. A cocoa butter substitute according to claim 2 where the make-up of the fatty acid groups is, by weight:
   (a) about 35% lauric acid;
   (b) about 60% palmitic acid; and
   (c) about 5% other fatty acids.

4. A cocoa butter substitute according to claim 1 wherein the sucrose fatty acid esters contain no more than three unesterified hydroxyl groups.

5. A cocoa butter substitute according to claim 1 wherein the other fatty acids are selected from the group consisting of capric, myristic, and stearic acids, and mixtures thereof.

6. A cocoa butter substitute comprising sucrose fatty acid esters having at least four fatty acid ester groups, and where the make-up of the fatty acid groups is, by weight:
 (a) from about 25% to about 50% capric acid;
 (b) from about 50% to about 75% stearic acid; and
 (c) up to about 5% other fatty acids.

7. A cocoa butter substitute according to claim 6 where the make-up of the fatty acid groups is, by weight:
 (a) from about 30% to about 40% capric acid;
 (b) from about 55% to about 65% stearic acid; and
 (c) up to about 5% other fatty acids.

8. A cocoa butter substitute according to claim 7 where the make-up of the fatty acid groups is, by weight:
 (a) about 35% capric acid;
 (b) about 60% stearic acid; and
 (c) about 5% other fatty acids.

9. A cocoa butter substitute according to claim 6 wherein the sucrose fatty acid esters contain no more than three unesterified hydroxyl groups.

10. A cocoa butter substitute according to claim 6 wherein the other fatty acids are selected from the group consisting of lauric, myristic, and palmitic acids, and mixtures thereof.

* * * * *